United States Patent Office 3,345,900
Patented Oct. 10, 1967

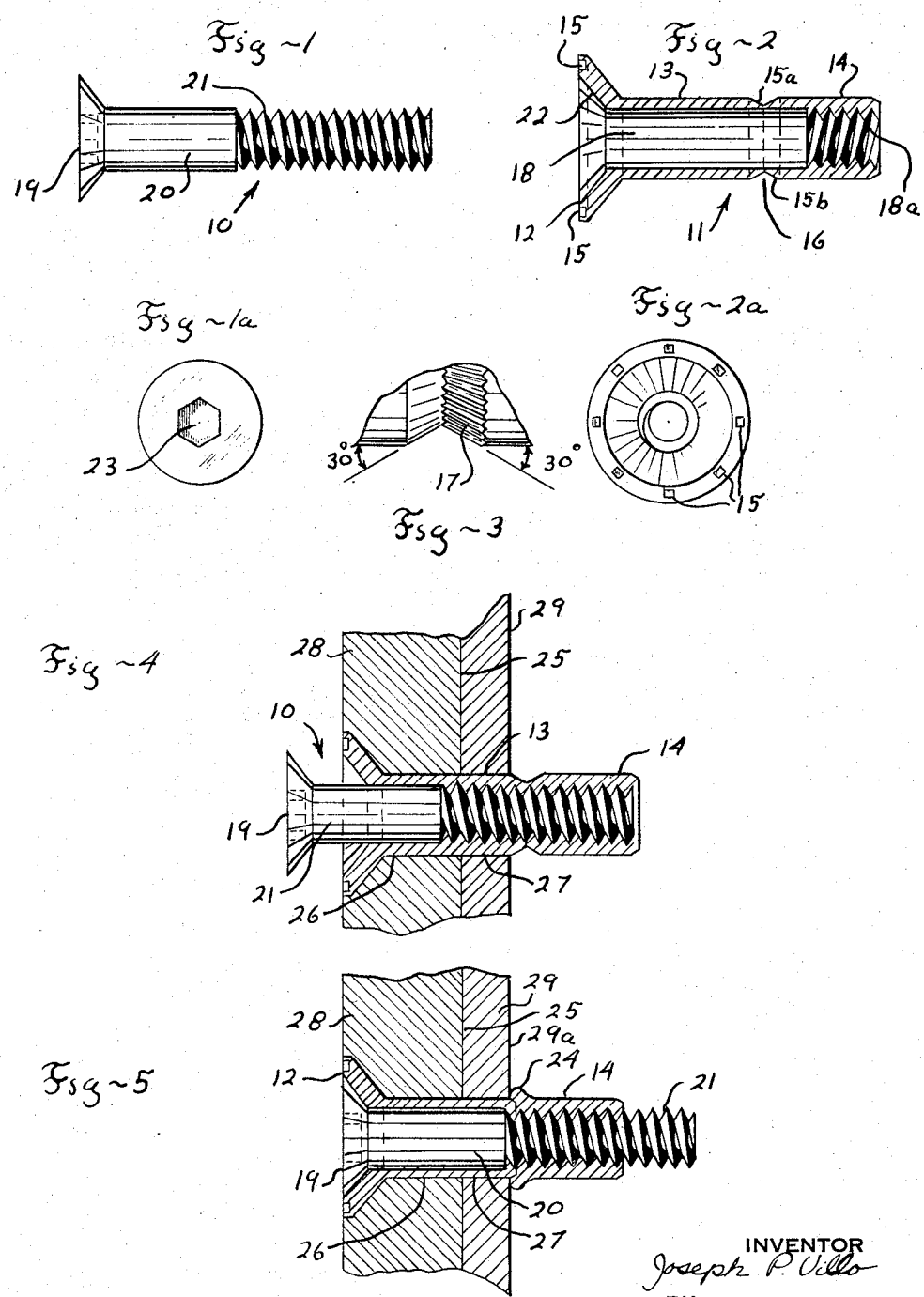

3,345,900
BLIND FASTENER
Joseph P. Villo, Rydal, Pa., assignor to Standard Pressed Steel Co., Jenkintown, Pa., a corporation of Pennsylvania
Filed Oct. 15, 1964, Ser. No. 403,977
3 Claims. (Cl. 85—72)

This invention relates to fasteners and more particularly to the so-called blind fasteners, i.e., those which are used to secure a plurality of sheets, plates or other members together from one side only of the assembly or to insert a stud in a wall or similar panel arrangement.

In the increasingly complex and highly stressed structures used in industries such as the aircraft and aerospace industries, there has been an ever-increasing demand for reliable fasteners which are capable of withstanding unusual conditions of loading but are still relatively low in cost and simple to install. Because such fasteners are usually subjected to dynamic loads, problems of vibration and fatigue not ordinarily present in a conventional fastener, are factors which further complicate their design. In many instances, such fasteners must be used in places where access to the members to be fastened together is limited to one side only of the assembly—hence the development of the so-called "blind" fastener which is provided with expandable means to achieve its clamping function.

While performing quite satisfactorily in many respects blind fasteners presently available have various shortcomings which have limited their use. Many of these fasteners are rather complex and expensive, and so they have only been used for very specialized applications where cost is not a prime factor. Others, such as rivets, will not withstand high tensile stresses, are not readily removable from a joint and cannot be preloaded.

Accordingly, it is a primary object of this invention to provide an improved blind fastener which is capable of withstanding conditions of high dynamic loading.

It is a further object of this invention to provide an improved blind fastener which is simple in construction and dependable in use.

It is a more specific object of this invention to provide a blind fastener which is of a two-piece construction.

In accordance with this invention, these and other objects are achieved by a fastener comprising a sleeve member having integral head, shank and nut portions. The shank and nut portions preferably are of circular cross section and of substantially the same external diameter. An external circumferential groove is positioned intermediate the nut portions and shank portions. This groove is usually V-shaped so as to form a tapered surface on the shank portion adjacent the nut portion. One surface of the groove (usually on the nut portion) has a knurled configuration. The sleeve member is provided with an axial bore extending through the head, the shank and at least a portion of the nut section and the bore is internally threaded in the region defining the nut portion with threads whose major diameter is slightly less than the bore diameter. The fastener assembly further includes a headed core bolt. The bolt head is provided with a tool receiving driving surface for application of torquing forces about the bolt axis. The externally threaded bolt shank is dimensioned so that when it is inserted into the bore from the head end of the sleeve, the bolt threads will engage the mating internal threads of the nut portion of the sleeve member. When torquing forces are applied to the core bolt, the nut portion swages over the shank at the thinner sleeve wall subtended by the circumferential groove, and it expands in diameter and separates from the shank thereby forming a second bearing surface adapted to cooperate with the sleeve head when the fastener is installed and formed. The knurls prevent rotation of the nut during the swaging operation.

Additional objects and advantages will become apparent in the ensuing detailed description and in the drawings in which:

FIGURE 1 is a view showing a core bolt formed in accordance with this invention;

FIGURE 1a is an end view of the core bolt shown in FIGURE 1;

FIGURE 2 is a sectional view of a sleeve member formed according to the teachings of this invention;

FIGURE 2a is an end view of the sleeve of FIGURE 2;

FIGURE 3 is a detail showing the knurled groove separating the shank and nut portions of the sleeve member;

FIGURE 4 shows a blind fastener assembly positioned and ready for installation and;

FIGURE 5 shows the fastener after installation.

As illustrated in the drawings, the fastener is formed in two elements, a core bolt 10 shown in FIGURE 1 and a headed sleeve 11 shown in FIGURE 2. The sleeve 11 is provided with a head 12, a shank portion 13 and a nut portion 14 integral therewith. As illustrated, a countersunk type head 12 is provided with gripping surfaces, such as slots or recesses 15 shown in FIGURE 2a. The head and gripping surfaces may assume various forms as will be readily apparent to those skilled in the art. For example, a conventional hexagonal flat head could be readily employed. A circumferential groove 16 on the body of sleeve member 11 divides the body into the nut and shank portions. While other groove configurations capable of providing a tapered tip at the outermost end of the shank could be used, I have found it preferable to use a V-shaped configuration such as shown in FIGURE 2 and in more detail, in FIGURE 3. The surface of this V-shaped groove, which is integral with the nut body, is provided with small teeth or knurls 17. The knurls however can be on either or both tapered surfaces. As shown in FIGURE 3, each side of the groove forms an angle with the nut axis which is preferably on the order of 30°. Sleeve member 11 is further provided with an axial bore 18 which extends through the head, shank and into the nut portion of the body. The bore is provided with threads 18a in the region within the nut body and coaxially aligned with the bore axis. The remaining portion of the sleeve (i.e., the bore portion passing through the sleeve shank and head) is counterbored so that the threaded core bolt, described hereinafter, may be inserted from the head end of the sleeve member so that its threads will engage the threads 18 and apply torque to the nut 14 when the bolt is tightened to the point where the bolt head is brought into bearing.

Core bolt 10, as shown in FIGURE 1, is provided with a head 19, a body 20, and a threaded shank 21. The threaded portion 21 is positioned so that a sufficient number of its threads are engageable with the threads of the nut portion 18 to pull the nut over the shank of the sleeve to form the bearing head 24. The body portion 20 of the core bolt in the plane of the joint 25 wherein the fastener is installed (FIGURE 5), is unthreaded so that no threads of the loaded assembly are in shear. The bolt head 19 is adapted to fit in a countersunk recess 22 in the sleeve member head and is preferably provided with the hexagonal driving recess 23 shown in FIGURE 1a, although other internal or external driving configurations may be employed.

In use, the core bolt 10 is inserted into sleeve member 11 and this assembly is in turn inserted into the registering openings 26, 27 in the members 28, 29 to be fastened together, as shown in FIGURE 4. A conventional power or hand tool which has wrenching surfaces engageable with the hexagonal recess 23, is used to rotate the core bolt 19. If the fastener sleeve 10 is prevented from rotating (either by the same or a different tool), the wrenching force applied to the bolt when the bolt head is brought into bearing will be transmitted to the nut in the form of an axial force directed towards the shank 12 of the fastener member 10. At a predetermined torque, the nut separates from, and swages over the tapered portion 15a of shank 13 and upon further tightening of the core bolt, a bearing 24 head is formed when the nut is brought into engagement with the inner face 29a of the joint member 29, and in this way a desired "preload" is placed on the joint.

An important feature of the invention lies in the knurled configuration of the grooved surface 15. As the nut 14 begins to swage over the shank 12, the teeth 17 on surface 15b bite into the opposite face 15a of the groove. When the nut and shank are separated, these teeth tend to prevent nut rotation with respect to the sleeve member. The applied force therefor causes the nut to continue to swage over the shank 12. The teeth 17 also resist the tendency of the nut to loosen when the fastener is subjected to vibration.

The present invention affords a blind fastener in which no engaged threads are present in the shear plane. The fastener is simple to fabricate and install, consisting of only two pieces, and consequently is lower in cost than conventional 3 or 4 piece blind fasteners. In addition, the fastener may be readily removed by merely backing out the core bolt. Only the nut remains behind the panel assembly.

I claim:
1. A blind bolt assembly including:
   a sleeve member having integral head, shank and nut portions;
   the shank and nut portions being of substantially uniform external diameter;
   a V-shaped external circumferential groove thinning the sleeve wall intermediate said nut and shank portions to its smallest cross-sectional area, said groove being positioned on the sleeve so that when installed in a blind application the groove will project beyond the blind face of the workpiece, the surface of the groove that is integral with the nut being provided with axially extending knurls and the sides of the groove forming divergently opposed included angles of about 30° with the longitudinal axis of the fastener;
   a bore extending axially through said head and shank portions and into the nut portion;
   the bore having a slight coaxial counterbore in the region of said head and shank portions and being internally threaded in the region of said nut portion;
   said assembly having means for restraining rotation of the sleeve about the axis of the sleeve bore;
   a core bolt having a head, said head having a tool receiving driving surface for the application of torquing forces thereto, said bolt having an elongated shank dimensioned for insertion into the bore of said sleeve member from the head end thereof and having an externally threaded end portion for engagement with the threads in the nut portion of the sleeve, said assembly being adapted to effect separation and swaging of said nut portion from and over the shank of said sleeve member upon the transmission of torquing forces to the nut from the core bolt.

2. A blind bolt assembly according to claim 1, wherein the bore of the sleeve member is unthreaded in the portion subjected to shearing forces by a jointed assembly held between said head and nut portions.

3. A blind bolt assembly according to claim 1, wherein the means for restraining rotation of the sleeve comprises tool engaging surfaces on the sleeve.

References Cited
UNITED STATES PATENTS

| | | | |
|---|---|---|---|
| 1,852,089 | 4/1932 | Pleister et al. | 85—72 |
| 2,102,230 | 12/1937 | Waterman | 85—72 |
| 2,324,142 | 7/1943 | Eklund | 85—70 |
| 2,863,351 | 12/1958 | Vaughn | 85—73 |
| 2,971,425 | 2/1961 | Blakeley | 85—73 |
| 3,078,002 | 2/1963 | Rodgers | 85—73 |
| 3,236,143 | 2/1966 | Wing | 85—72 |

FOREIGN PATENTS

| | | |
|---|---|---|
| 145,336 | 2/1952 | Australia. |
| 916,981 | 9/1946 | France. |
| 1,266,450 | 5/1961 | France. |

CARL W. TOMLIN, *Primary Examiner.*

EDWARD C. ALLEN, *Examiner.*

M. PARSONS, JR., *Assistant Examiner.*